(12) United States Patent
Canter et al.

(10) Patent No.: US 8,996,869 B1
(45) Date of Patent: Mar. 31, 2015

(54) SECURE MISSION MODULE

(71) Applicant: BAE Systems Information and Electronic Systems Integration Inc., Nashua, NH (US)

(72) Inventors: Jeffrey B. Canter, West Orange, NJ (US); Mark J. Badcock, Essex Fells, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 171 days.

(21) Appl. No.: 13/932,477

(22) Filed: Jul. 1, 2013

Related U.S. Application Data

(60) Provisional application No. 61/667,041, filed on Jul. 2, 2012.

(51) Int. Cl.
*H04L 29/06* (2006.01)
*H04L 9/30* (2006.01)
*H04L 9/08* (2006.01)

(52) U.S. Cl.
CPC ............ *H04L 63/08* (2013.01); *H04L 63/0428* (2013.01); *H04L 9/30* (2013.01); *H04L 9/08* (2013.01)
USPC ......................................... 713/168; 380/277

(58) Field of Classification Search
CPC ... H04L 63/08; H04L 63/0428; H04L 63/061; H04L 9/08; H04L 9/30; H04L 9/09
USPC ....................... 713/168, 171; 380/277, 28–30
See application file for complete search history.

(56) References Cited

U.S. PATENT DOCUMENTS

| | | | |
|---|---|---|---|
| 2003/0016826 A1* | 1/2003 | Asano et al. .................. | 380/277 |
| 2004/0165726 A1* | 8/2004 | Yamamichi et al. .......... | 380/277 |
| 2008/0163349 A1* | 7/2008 | Okimura et al. .................. | 726/9 |
| 2009/0144202 A1* | 6/2009 | Hurry .............................. | 705/67 |

* cited by examiner

*Primary Examiner* — Michael Pyzocha
*Assistant Examiner* — Shaqueal Wade
(74) *Attorney, Agent, or Firm* — Sand & Sebolt; Daniel J. Long

(57) ABSTRACT

A system and method for converting a device between an authorized device and an unauthorized device may include a crypto ignition key (CIK) and a mission module. The CIK may store an original device number corresponding to a device. The mission module typically loads a local mission and a key, decrypts the local mission with the key to produce a decrypted local mission, and generates an internal file encryption key (IFEK) and an internal split. The mission module may then encrypt the decrypted local mission to produce an encrypted local mission and then erase the IFEK. The mission module, when attached to the device, may read an additional device number from the device and recreate the IFEK based on the additional device number and the internal split. The mission module may decrypt the encrypted local mission and install the results in the device to convert the device into an authorized device.

19 Claims, 6 Drawing Sheets

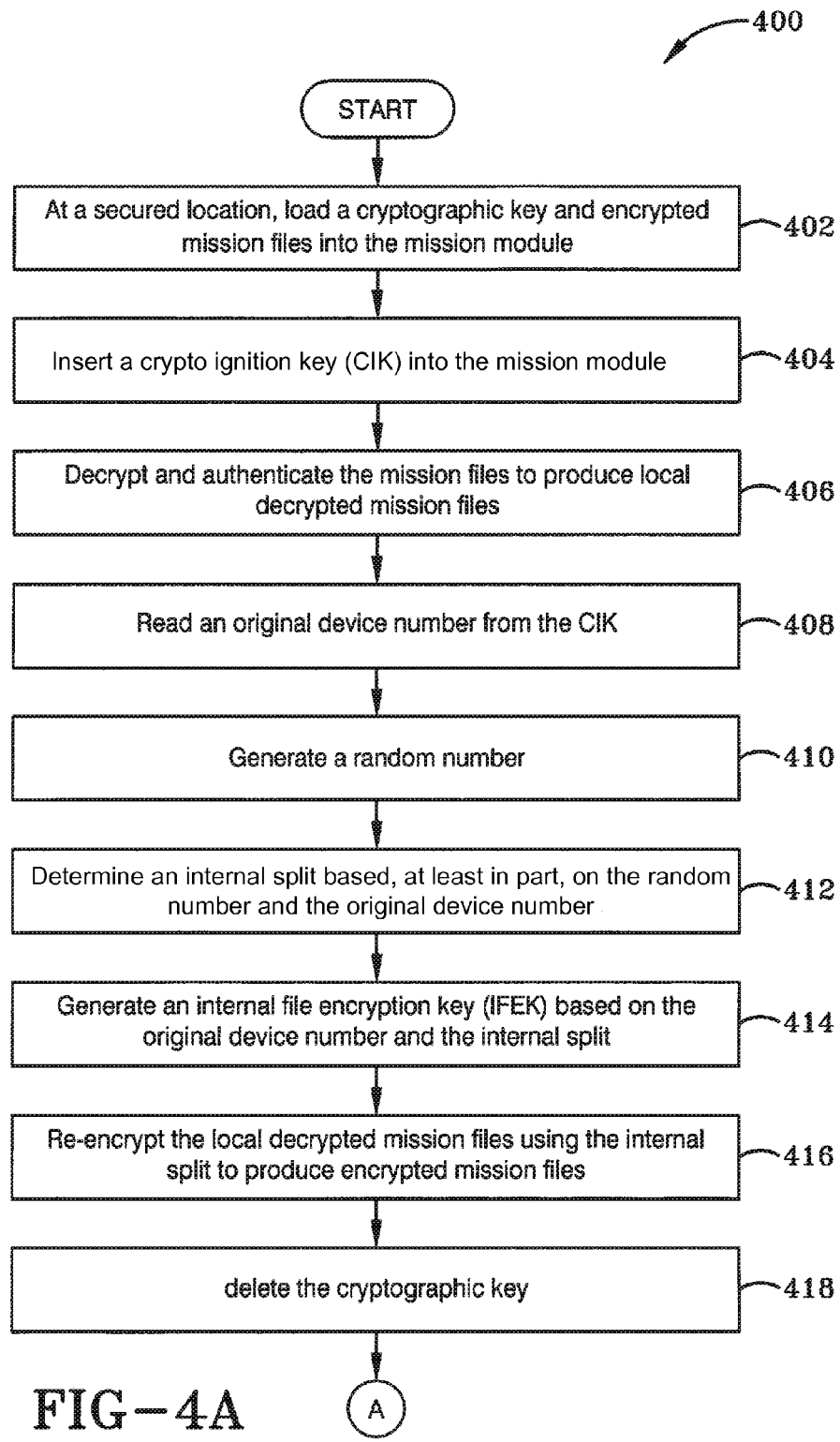

SECURE MISSION MODULE

CROSS REFERENCE TO RELATED APPLICATION

This application claims priority from U.S. Provisional Application Ser. No. 61/667,041, filed Jul. 2, 2012; the disclosure of which is incorporated herein by reference.

BACKGROUND OF THE INVENTION

1. Field of Invention

The current invention relates generally to apparatus, systems and methods for secured computing and/or communicating. More particularly, the apparatus, systems and methods relate to authorizing devices. Specifically, the apparatus, systems and methods provide for a way of delivering to and converting an unauthorized device into an authorized device and then later returning that device to an unauthorized device without any loss of security.

2. Description of Related Art

The desire for security has been around of eons. Physical security can be used to prevent the unauthorized use or the taking of property that belongs to someone by another unauthorized person. More recently, secured communications have been developed to prevent an unauthorized listener from detecting what is being communicated on a secured communication system. Additionally, today many electronic devices or other classified devices are only intended to be used by certain authorized users and no one else, as they may perform some classified function or generate classified data. One way to protect these devices is to physically secure them away from unauthorized users. However, this can be both expensive and make use of such devices more inconvenient than it needs to be. What is needed is a better way to deliver secured functionality (e.g., a mission) to an unauthorized device and turn it into an authorized device.

SUMMARY

In one aspect, the invention may provide a system comprising: a crypto ignition key (CIK) configured to store an original device number corresponding to a particular device; a mission module comprising: read logic configured to read mission files from an outside device and to read the original device number from the CIK; cryptographic logic configured to decrypt and authenticate the mission files and to produce decrypted local mission files; random number logic configured to generate a random number; and key logic configured to (a) determine an internal split, based at least in part on the random number and the original device number, (b) generate an internal file encryption key (IFEK), based at least in part the original device number and the internal split, and (c) create a new device number and to have the original device number in the CIK replaced with the new device number; wherein the cryptographic logic is configured to re-encrypt the decrypted local mission files into re-encrypted internal mission files for storage within the mission module; wherein the mission module is configured to delete the IFEK after the re-encrypted internal mission files are created and to erase the decrypted local mission files; wherein when the mission module is attached to the particular device with the CIK, (a) the read logic is configured to read an additional device number from the particular device, (b) the key logic is configured to recreate the IFEK based at least in part on the additional device number and the internal split, and (c) the cryptographic logic is configured to decrypt the re-encrypted internal mission files and produce remote decrypted mission files; and wherein the mission module is configured to install the remote decrypted mission files in the particular device to convert the particular device from an unauthorized device to an authorized device.

In another aspect, the invention may provide a system comprising: a crypto ignition key (CIK) which stores an original device number corresponding to a particular device; a mission module configured to (a) load a local mission and a key, (b) decrypt the local mission with the key to produce a decrypted local mission, (c) generate an internal file encryption key (IFEK) and an internal split, based at least in part on the original device number, (d) encrypt the decrypted local mission to produce an encrypted local mission using the IFEK, and (e) erase the IFEK after the encrypted local mission is created; and wherein when the mission module is attached to the particular device together with the CIK, the mission module is configured to (a) read an additional device number from the particular device, (b) recreate the IFEK based at least in part on the additional device number and the internal split, the mission module being capable of recreating the IFEK only when the additional device number is the same as the original device number, and (c) decrypt the encrypted local mission and produce remote decrypted mission files; and wherein the mission module is configured to install the remote decrypted mission files to convert the particular device from an unauthorized device to an authorized device.

In another aspect, the invention may provide a method of using a secure mission module comprising: in a secured location, loading a cryptographic key and encrypted mission files into the mission module; inserting a crypto ignition key (CIK) into the mission module; decrypting and authenticating the mission files to produce local decrypted mission files, wherein the decrypting is based at least in part on the cryptographic key; reading an original device number from the CIK; generating a random number; determining an internal split, based at least in part on the random number and the original device number; generating an internal file encryption key (IFEK) based on the original device number and the internal split; re-encrypting the local decrypted mission files using the internal split to produce encrypted mission files; deleting the cryptographic key from the mission module; creating a new device number based at least in part on the internal split; replacing the original device number in the CIK with the new device number; moving the mission module and the CIK from the secured location to an unsecured location; attaching the mission module and the CIK to an unauthorized device in the unsecured location; reading the original device number from the unauthorized device; converting the unauthorized device into an authorized device by regenerating the IFEK, based at least in part on the original device number and the internal split; decrypting the encrypted mission files using the IFEK to produce remote decrypted mission files; and installing the remote decrypted mission files in the authorized device.

BRIEF DESCRIPTION OF SEVERAL VIEWS OF THE DRAWINGS

One or more embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIGS. 4A and 4B together form a flow chart illustrating a method of using a secured mission module.

Similar numbers refer to similar parts throughout the drawings.

DETAILED DESCRIPTION

Figure 1:
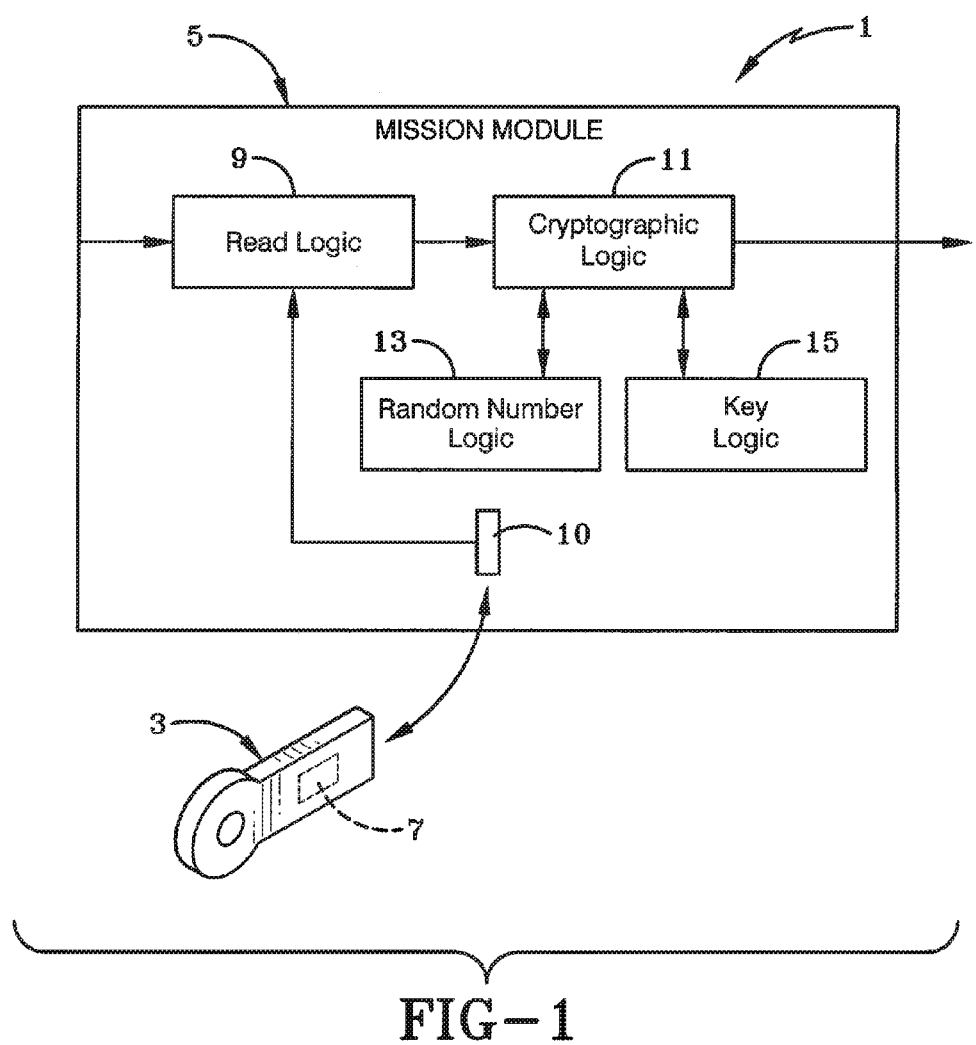
FIG. 1 illustrates a sample embodiment of a system that includes a secured mission module.

FIG. 1 illustrates a system 1 that can convert an unauthorized (non-secure) device into an authorized (secure, controlled cryptographic item (CCI)) device. The system 1 includes a crypto ignition key (CIK) 3 and a mission module 5. FIG. 1 illustrates the preferred embodiment of a mission module 5 that can be used with any electronic device or any other device where there is a desire for security. A few specific examples of types of current devices that the mission module 5 and CIK 3 can be used with include converting an unsecured (unauthorized) computer to a secured (authorized) computer and converting an unsecured camera into a secured camera. After describing FIG. 1, a more detailed analysis is provided for the conversion of non-CCI (unsecured) radio into a CCI (secured) radio for use in a mission and/or a war game in a military environment. However, the mission module 5 and CIK 3 can be used in a wide variety of other scenarios, a few of which are discussed further below.

Those of ordinary skill in the art will appreciate that any type of cryptographic functions can be implemented in mission module 5 and/or in the item that mission module 5 is used in conjunction with. For example, block cyphers, such as the advanced encryption standard (AES), data encryption standard (DES), triple DES and/or others can be used. Signature/authentication algorithms, hash functions and other cryptographic functions can be performed in the mission module 5 and/or the item it is used with.

CIK 3 stores an original device number corresponding to a single particular device. The device number is typically stored into a memory 7 in the CIK 3 at the same time the device is manufactured. All or a portion of mission module 5 may be inserted into a given particular device. Thus, mission module 5 may be attached to and removed or detached from a given particular device, wherein the attachment may be achieved by inserting all or a portion of module 5 into the particular device. Mission module 5 may include read logic 9, cryptographic logic 11, random number logic 13 and key logic 15. "Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Read logic 9 reads mission files from an outside device and reads the original device number from the CIK 3 upon the CIK 3 being inserted through a slot 10 in the mission module 5. The cryptographic logic 11 decrypts and authenticates mission files and produce local mission files. The mission files are secure files that instruct a device that the mission module will later be plugged in to operate in a secure mode. Typically, the cryptographic logic 11 decrypts and authenticates mission files inside a secured facility so that the secure integrity of those files is not compromised. Later, when the loading of the mission module 5 with the mission is complete, mission module 5 can be taken from the secure facility and plugged into the unsecured device out in the unsecured location to configure the device into a secured (authentic, CCI) device.

Random number logic 13 is used to generate a random number used in securing the mission module 5. The key logic 15 generates an internal split based at least in part on a random number from the random number logic 13 and the original device number. The key logic 15 will generate an internal file encryption key (IFEK) based at least in part on the original device number and the internal split. The key logic 15 also creates a new device number and has the original device number in the CIK replaced with the new device number. This new number is only known to the mission module 5 and is created so that the mission module 5 can later be reused in a secured future mission as discussed below.

Cryptographic logic 11 then re-encrypts the local mission files into encrypted internal mission files for storage within the mission module so that encrypted internal mission files are secure while the mission module 5 is transported to the device it will be used with. At this time, the mission module 5 also deletes the IFEK after the encrypted internal mission files are created and also erases the unsecure decrypted local mission files.

When mission module 5 attached to the particular device and the CIK 3 is plugged into the mission module 5, the read logic 9 reads a device number from the particular device. The key logic 15 then also recreates the IFEK based at least in part on that read device number and the internal split. Note that the IFEK can only be recreated when the device number read from the device equals the device number initially read from the CIK 3 when the mission files were first loaded into the mission module. This ensures that the mission module 5 can only be used with that one intended device. Next, the cryptographic logic 11 decrypts the encrypted internal mission files using the IFEK to produce remote decrypted mission files. The mission module 5 installs the remote decrypted mission files into the intended particular device to finish converting the intended particular device from an unauthorized device into an authorized device.

When the IFEK is generated with the mission module 5 attached to the particular device, the particular device can be turned off and the CIK 3 removed from mission module 5. As long as the mission module 5 remains attached to the particular device (with CIK 3 removed from module 5), mission module 5 retains the IFEK and the particular device can be restarted (with CIK 3 removed from module 5), in a same mission state as before the particular device was turned off. Some devices may require a user to securely log in to them in order to restart them. In summary, when the IFEK is generated with the mission module 5 attached to the particular device, the particular device with the mission module 5 is a classified controlled cryptographic item (CCI). Later, upon removal of mission module 5 from the particular device, the zeroing logic of key logic 15 erases the IFEK and the particular device becomes an unclassified CCI.

Figure 2:
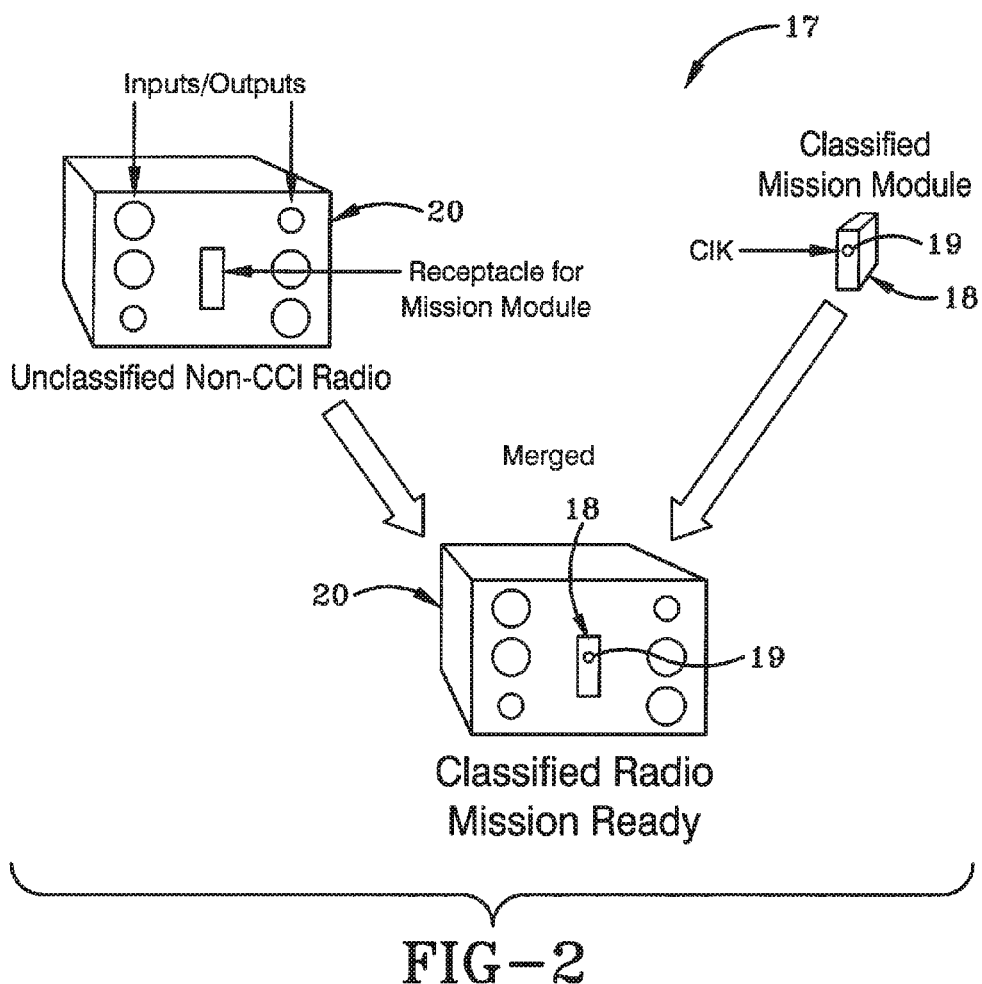
FIG. 2 illustrates another sample embodiment of a system that includes a secured mission module in use with a radio.
Figure 3:
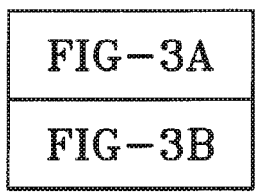
FIGS. 3A and 3B illustrate a flow diagram of a system that includes a secured mission module in use with a radio.
Figure 3A:
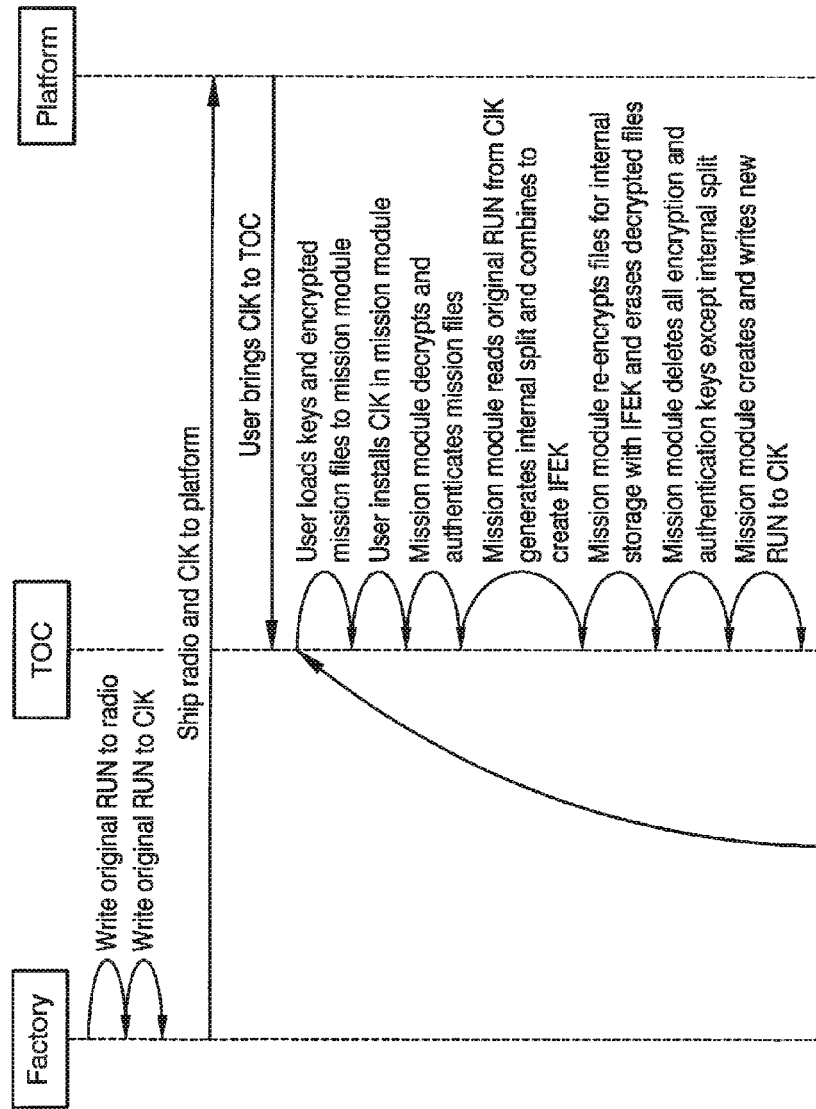
Figure 3B:
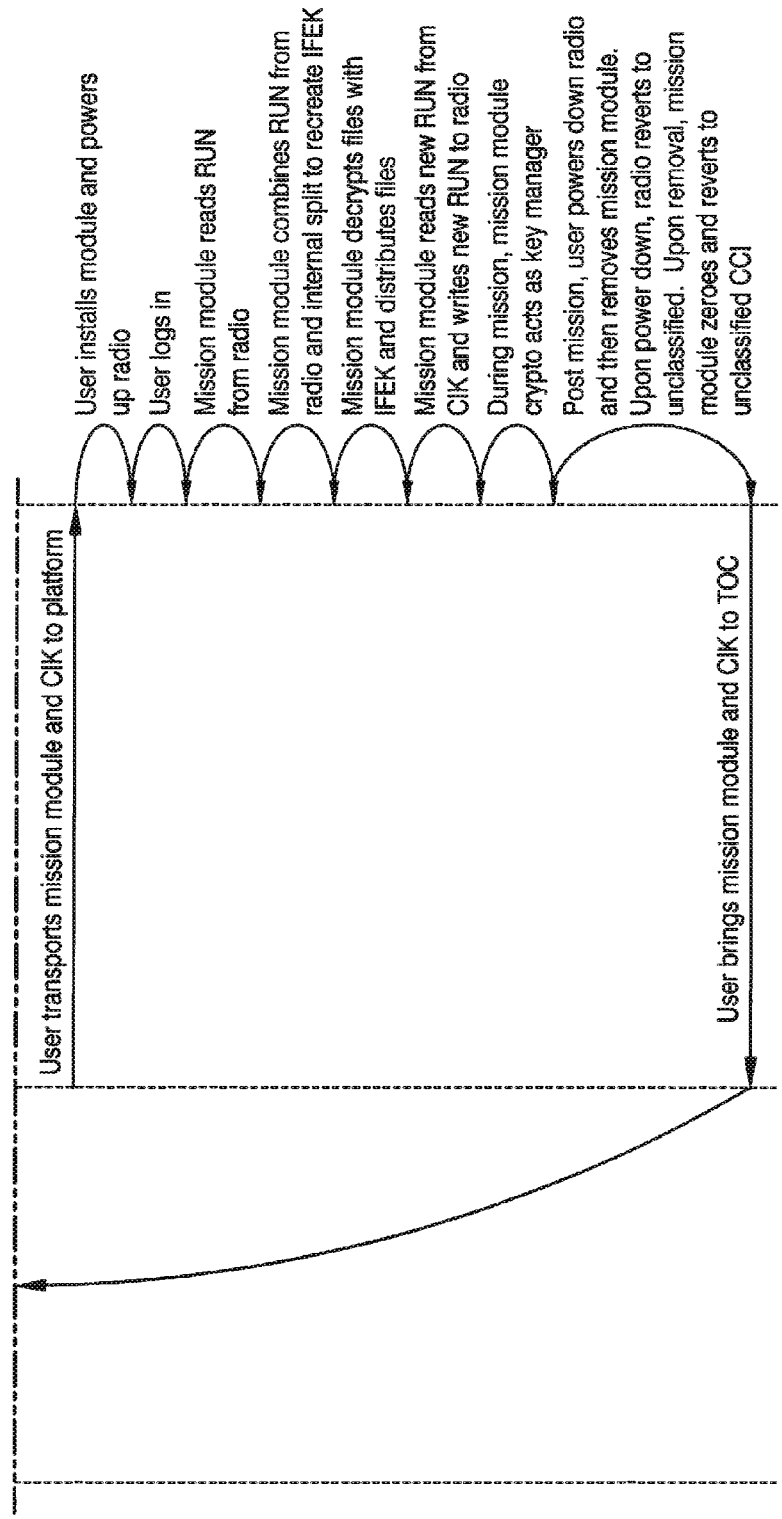

A second embodiment of a system 17 is shown generally in FIG. 2 and includes a mission module 18 and its associated CIK 19 that is used with a military radio 20. Similar to the previous embodiment, all or a portion of mission module 18 may be inserted into a given particular device or radio, such as into the receptacle (FIG. 2) in the unclassified non-CCI radio. Thus, mission module 18 may be attached to and removed or detached from a given particular device or radio, wherein the attachment may be achieved by inserting all or a portion of module 18 into the particular device or radio. FIG. 3 is useful to see where different actions are performed during the life of a mission.

When the radio 20 is first produced, all the unclassified hardware—e.g., processors, field-programmable gate arrays (FPGAs), etc.—and all the unclassified software (operating environments, etc.) are installed in the factory. The memories used for OE etc. are not accessible in the field. One non-volatile memory in the radio may be accessible in the field. The factory will write into this memory a unique number (every radio will be different) called the Radio Unique Number (RUN). The radio will contain a receptacle for a mission module such that the mission module can be securely mounted into the radio and will have access to the aforementioned non-volatile memory and the ability to program the radio components' volatile memories. The factory will also put the RUN into another non-volatile memory (the CIK) which can be plugged into the mission module. The CIK gets shipped with the radio.

As discussed above, the mission module 18 is a small plug-in component to the radio 20 and may contain non-volatile memory that would be loaded with the data that the radio 20 would need to perform the mission. This data could include, but is not limited to, cryptographic equipment applications (CEAs), keys, waveform files, etc. The mission module 18 may contain a Type 1 cryptographic processor and the necessary circuitry to make it an unclassified CCI when not keyed, but capable of secret and below when in operation. As seen in FIG. 3, when the radio 20 and CIK 19 reach their destination and the radio gets installed into a platform. At mission time, the radio operator will take the CIK to the Tactical Operations Center (TOC) (this term will be used to specify the secure facility where missions are determined and keys and mission software and firmware can be loaded). The user will then plug a mission module 18 into a fixture which will include a key loading device and mission software loading device (or inputs for these devices) and download the keys, software and firmware images that module 18 will need for the mission. The user may have brought a mission module 18 with him or obtained one at the TOC. By way of example, mission module 18 may need only two keys, the external file encryption key (EFEK) and a file authentication credential (FAC) (the mission files are encrypted and signed). The user will then plug in or insert CIK 19 into mission module 18. Upon receiving the CIK present signal indicating that CIK 19 is plugged into or connected to module 18, the mission module 18 will decrypt and authenticate the mission files using the downloaded EFEK and FAC. Once this process is complete, the mission module 18 will read the original RUN from the CIK, create a random number which may be of equal length to the original RUN (call this random number the "internal split"), and combine the random number with the original RUN to produce an internal file encryption key (IFEK). Module 18 will use this key to encrypt the files for storage in the mission module 18. After module 18 has completed the encryption process, module 18 will (1) erase the IFEK, EFEK and FAC, saving only the internal split, and (2) erase the RUN from the CIK and replace it with a new RUN that it creates. This new RUN will be different from both the original RUN and the internal split. The mission module 18 is now safe to remove from the fixture and transport to the platform.

The radio 20 will be produced as non-CCI. CCI is a term used to designate secure telecommunications or the handling of classified information. The radio itself will contain the safeguards (anti-Tamper, TEMPEST, etc.) required to operate with classified data, however, the only key the radio would have would be the unclassified RUN. It would also have uncommitted assets such as processors and/or field-programmable data arrays (FPGA) to produce the cryptographic functionality when loaded by the mission module 18. The classified mission module 18 would be coupled with the radio 20 using the radio identifier to ensure the desired radio receives the correct mission load. After user logon, the mission module 18 reads the original RUN from the internal memory of the radio 20 and recreates the IFEK (this will only work if installed in the correct radio). It then decrypts the mission files and loads them into the radio 20. After that step is complete, the mission module 18 will read the new RUN from the CIK 19 and program that into the radio's non-volatile memory. Once the mission module software is downloaded, the radio 20 would then operate as any other configured radio. The mission module 18 and radio 20 are now both classified to the highest level of any channel in the radio 20.

During operation, the mission module 18 acts as a standard key manager. The CIK 19, since it is again paired with the radio, will operate as a standard CIK 19 (as far as it remains a part of user identification to the radio 20). The radio 20 can be turned off and the CIK removed. As long as the mission module 18 remains in the radio 20, the radio can be restarted in the same mission. In this state, however, the radio 20 is still CCI as it retains the IFEK. When the radio 20 is powered up again, the mission module 18 will require the CIK and user logon to decrypt and reinstall the mission files.

At the end of the mission, the classified mission module 18 would be removed from the radio 20. Removing the mission module from the radio will cause zeroing logic of module 18 to zeroize, erasing the IFEK, and result in it being downgraded to unclassified CCI. The radio 20 would then be passively zeroized by turning it off, thereby clearing any classified material or components from its volatile memory. The radio 20 would remain in the field where it would no longer require guarding or any other special handling, and the mission module would be the only CCI and would have to meet all NSA handling criteria. The radio anti-Tamper and TEMPEST features do not make it CCI.

The next time the radio 20 is needed, the process is repeated. Any mission module 18 can be used for any radio 20, as the radio identity is held by the CIK. Additionally, mission modules can be transported to the TOC and programmed, rather than requiring the mission computer and key loader to be transported individually to each radio in the field (although this remains an option).

Referring to FIG. 2, the radio 20 is initially an unclassified non-CCI radio, capable of receiving the classified mission module 18. When the classified mission module 18 is merged (e.g., placed in the radio's receptacle) with the unclassified non-CCI radio, the radio 20 becomes a classified radio that is mission ready.

Having discussed various details of FIGS. 1-3, a few other example uses of the mission module 5 of FIG. 1 are described before describing a new and novel "reconfigurable general purpose device". In one scenario, the mission module 5 and CIK 3 can be used to securely transport classified information. For example, at a secure location, the mission module 5 can be loaded with data that is then encrypted using a device number in the CIK 3 and a key value. After encryption, the original device number is deleted from the CIK 3 so that the mission module 5 only contains the key value. A new device number is also generated and stored in the CIK 3 to allow the mission module 5 to later be reused as discussed in further detail below. Now the mission module 5 can be used to securely transport the classified information to another location over an unsecured area. This is because even if the mission module 5 falls into the wrong hands, its classified information cannot be decrypted because the mission module 5 only has the key value in the CIK 3, whereas both the key value and the device number are needed to decrypt the classified information. If the transportation of the mission module 5 and the CIK 3 from the secure location to the unsecure location is successful, the securely transported mission module 5 will be, at the other location, plugged into a device that has the same device number that was used to encrypt the classified information. Note that this same device number can be combined with the key in the CIK 3 and used to decrypt the classified information. Typically, only a single device will have the correct device number and the CIK 3 can only be plugged into that device in order to decrypt the classified information.

In another scenario, the mission module 5 and CIK 3 can be used for allowing a device to provide secure communications. At a secure location, the mission module 5 can be loaded with encryption parameters, values and/or algorithms. These values and algorithms are then encrypted based on a device number in the CIK 3 and a key value. After this encryption, the device number is deleted from the CIK 3 so that the mission module 5 only contains the key value and the encrypted parameters, values and/or algorithms. The mission module 5 and CIK 3 can now be safely transported to another unsecure unit or device and plugged into that unsecure unit. Next, the key value in the mission module 5 can now be combined with a device number at the unsecure unit that may be a unique device number and used to decrypt the encryption parameters and algorithms to allow the unsecure unit to become an authorized device or unit that can now securely communicate classified information.

In another scenario, the mission module 5 and CIK 3 can be used to allow another device to be used as a secured "sensor suite" that allows that device to receive data from a source or sources other than the mission module 5 and the CIK 3 that may contain unknown content and secure it for later analysis. In this case, at a secure area, a key and the device number in the CIK 3 are used to encrypt sensor suite mission files in the mission module. Again, the old device number is erased and a new device number is written into the CIK 3. Later, the mission module 5 and CIK 3 are plugged into a device to become the sensor suite device and the sensor suite mission files are decrypted at the sensor suite device (using the key in the mission module 5 and the device number at the device to become the sensor suite device), turning it into a classified device that can now receive data that may contain unknown content and secure the data for later analysis. When the sensor suite device has finished collecting data, the mission module 5 generates the same new device number that was earlier generated at the secure area and writes the new device number into the CIK 3, allowing the mission module 5 to be reused when it is returned to the secured area. When the mission module 5 is removed from the sensor suite device, the sensor suite device zeros itself out by removing all secure data and reverts back to an unauthorized/non-classified device. Once the mission module 5 is brought back to the secured area, the data collected with the sensor suite device that is stored in the mission module can be decrypted at the secure area based on the new device number in the CIK.

The mission module 5 and CIK 3 can also be used to configure a new and novel "reconfigurable general purpose device". For example, the mission module 5 and CIK 3 can be loaded with encrypted software as discussed above and then securely plugged into the reconfigurable general purpose device to program the device to perform as any one of a number of devices. For example, the reconfigurable general purpose device can be programmed to perform as a secure communication device to securely transmit and receive signals through wireless channels and/or wired channels. The reconfigurable general purpose device could alternatively be configured to operate as a classified/authorized radio. Alternatively, the reconfigurable general purpose device could be configured as a classified general purpose computer or virtually any other programmable device depending on what generic hardware and software are included in the reconfigurable general purpose device. It is envisioned that the reconfigurable general purpose device may be comprised of a variety of digital hardware components, a variety of analog hardware components, a variety of radio frequency (RF) components and the like. Once the mission module 5 and CIK 3 are plugged into the reconfigurable general purpose device, an encrypted software (or other logic) in the mission module may be decrypted and the reconfigurable general purpose device may be configured into a classified device by making the required connections between the required digital and analog hardware components, RF components and other components and software that are prebuilt into or preloaded into the reconfigurable general purpose device.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional blocks or steps which are not illustrated.

Figure 4B:
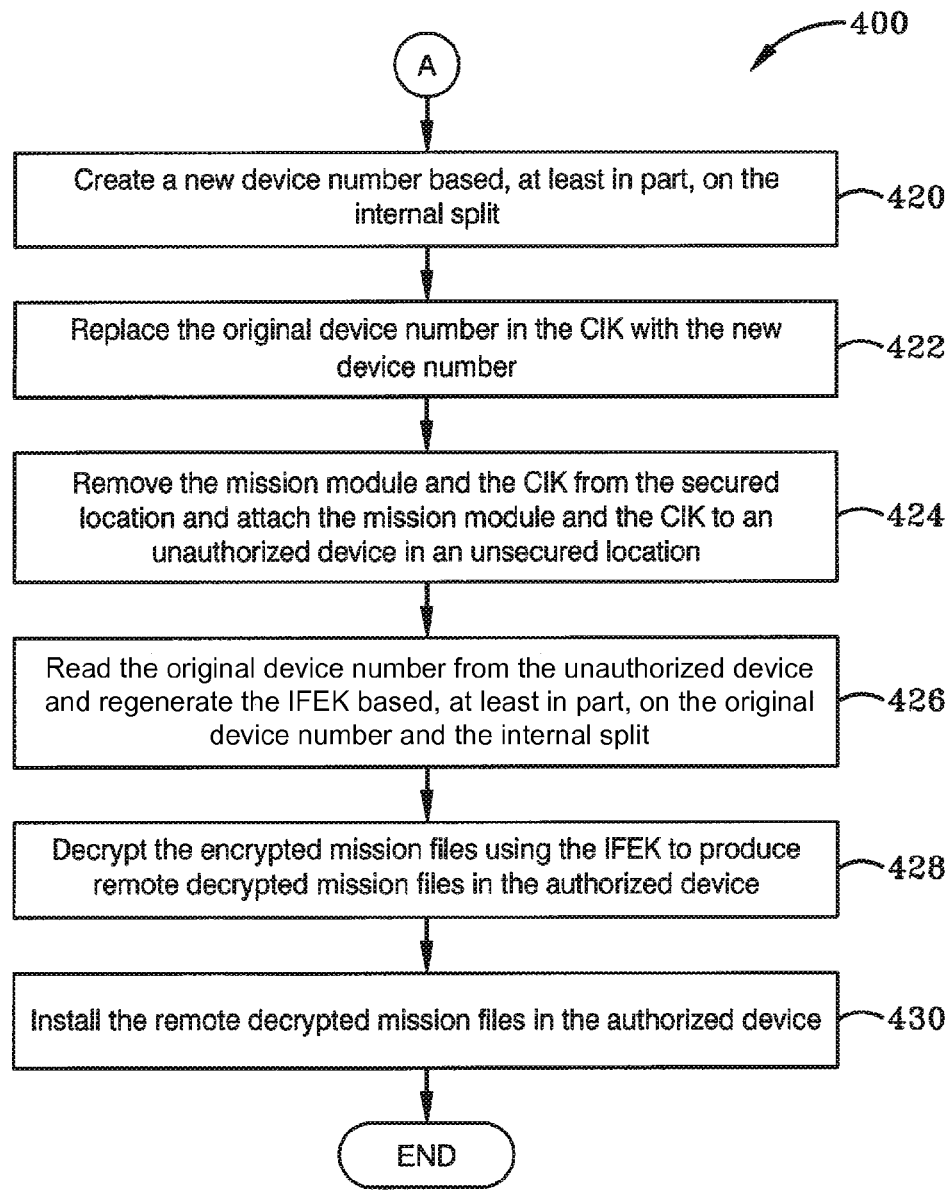

FIG. 4 illustrates a method 400 using a secure mission module. The method begins, at 402, at a secured location by loading a cryptographic key and encrypted mission files into the mission module. At 404, a crypto ignition key (CIK) is inserted into the mission module. Next, the mission files are decrypted and authenticated, at 406, to produce local decrypted mission files. The decrypting is based at least in part on the cryptographic key. An original device number is read from the CIK, at 408. As mentioned above, the device number would correspond to an actual device and would have been written to the CIK at the time the device was manufactured.

A random number is then generated, at 410, and an internal split is determined and generated at 412, based at least in part on the random number and the original device number. Next, at 414, an internal file encryption key (IFEK) is generated based at least in part on the original device number and the internal split. The local decrypted mission files are re-encrypted, at 416, using the internal split to produce encrypted mission files. The cryptographic key is deleted, at 418. A new device number is created, based at least in part on the internal split, at 420, and the original device number is replaced, at 422, in the CIK with the new device number.

The mission module and the CIK are removed from the secured location and are both attached to an unauthorized device in an unsecured location, at 424. The original device number is read, at 426, from the unauthorized device and the IFEK is regenerated, based at least in part on the original device number and the internal split. The regeneration of the IFEK converts the unauthorized device into an authorized device. Next, the encrypted mission files are decrypted, at 428, using the IFEK and producing remote decrypted mission files in the authorized device. The remote decrypted mission files are installed in the authorized device, at 430.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

What is claimed is:

1. A system comprising:
    a crypto ignition key (CIK) configured to store an original device number corresponding to a particular device;
    a mission module comprising:
    read logic configured to read mission files from an outside device and to read the original device number from the CIK;
    cryptographic logic configured to decrypt and authenticate the mission files and to produce decrypted local mission files;
    random number logic configured to generate a random number; and
    key logic configured to (a) determine an internal split, based at least in part on the random number and the original device number, (b) generate an internal file encryption key (IFEK), based at least in part the original device number and the internal split, and (c) create a new device number and to have the original device number in the CIK replaced with the new device number;
    wherein the cryptographic logic is configured to re-encrypt the decrypted local mission files into re-encrypted internal mission files for storage within the mission module;
    wherein the mission module is configured to delete the IFEK after the re-encrypted internal mission files are created and to erase the decrypted local mission files;
    wherein when the mission module is attached to the particular device with the CIK, (a) the read logic is configured to read an additional device number from the particular device, (b) the key logic is configured to recreate the IFEK based at least in part on the additional device number and the internal split, and (c) the cryptographic logic is configured to decrypt the re-encrypted internal mission files and produce remote decrypted mission files; and
    wherein the mission module is configured to install the remote decrypted mission files in the particular device to convert the particular device from an unauthorized device to an authorized device.

2. The system of claim 1 wherein the key logic is able to recreate the IFEK only when the additional device number is the same as the original device number.

3. The system of claim 1 wherein when the IFEK is generated with the mission module attached to the particular device, the particular device can be turned off and the CIK removed from the mission module; and wherein as long as the mission module remains attached to the particular device, the mission module retains the IFEK and the particular device can be restarted in a same mission state as before the particular device was turned off.

4. The system of claim 1 wherein the mission module further comprises:
    zeroing logic configured to erase the IFEK when the mission module is removed from the particular object.

5. The system of claim 1 wherein when the IFEK is generated with the mission module attached to the particular device, the particular device and the mission module is a classified controlled cryptographic item (CCI); and wherein when the mission module is removed from the particular object, the key logic erases the IFEK and the particular object becomes an unclassified CCI.

6. The system of claim 1 wherein the read logic is configured to read an external file encryption key (EFEK) and an external file authentication credential (FAC); and wherein the cryptographic logic is configured to use the EFEK and FAC to decrypt and authenticate the mission files and to produce the decrypted local mission files.

7. The system of claim 1 wherein when the cryptographic logic re-encrypts the local mission files into re-encrypted internal mission files, the key logic is configured to delete all encryption and authentication keys except the internal split.

8. The system of claim 1 wherein the mission module further comprises:
    number replacement logic configured to replace the original device number in the particular device with the new device number after the IFEK has been re-created after the mission module was attached to the particular device.

9. The system of claim 1 wherein the new device number was written into the particular device at a time the particular device was manufactured.

10. The system of claim 1 wherein the particular device is a radio.

11. The system of claim 1 wherein the mission module is configured to, after the internal mission files are created, delete all files and keys in the mission module except for the internal split and the internal mission files.

12. The system of claim 1 wherein the mission module further comprises a non-volatile memory; and the key logic is configured to write into the non-volatile memory at least one of the group of the IFEK and the internal split.

13. The system of claim 1 wherein the mission module is attachable to the particular device via insertion of the mission module into the particular device.

14. A system comprising:
a crypto ignition key (CIK) which stores an original device number corresponding to a particular device;
a mission module configured to (a) load a local mission and a key, (b) decrypt the local mission with the key to produce a decrypted local mission, (c) generate an internal file encryption key (IFEK) and an internal split, based at least in part on the original device number, (d) encrypt the decrypted local mission to produce an encrypted local mission using the IFEK, and (e) erase the IFEK after the encrypted local mission is created; and
wherein when the mission module is attached to the particular device together with the CIK, the mission module is configured to (a) read an additional device number from the particular device, (b) recreate the IFEK based at least in part on the additional device number and the internal split, the mission module being capable of recreating the IFEK only when the additional device number is the same as the original device number, and (c) decrypt the encrypted local mission and produce remote decrypted mission files; and
wherein the mission module is configured to install the remote decrypted mission files to convert the particular device from an unauthorized device to an authorized device.

15. A method of using a secure mission module comprising:
in a secured location, loading a cryptographic key and encrypted mission files into the mission module;
inserting a crypto ignition key (CIK) into the mission module;
decrypting and authenticating the mission files to produce local decrypted mission files, wherein the decrypting is based at least in part on the cryptographic key;
reading an original device number from the CIK;
generating a random number;
determining an internal split, based at least in part on the random number and the original device number;
generating an internal file encryption key (IFEK) based on the original device number and the internal split;
re-encrypting the local decrypted mission files using the internal split to produce encrypted mission files;
deleting the cryptographic key from the mission module;
creating a new device number based at least in part on the internal split;
replacing the original device number in the CIK with the new device number;
moving the mission module and the CIK from the secured location to an unsecured location;
attaching the mission module and the CIK to an unauthorized device in the unsecured location;
reading the original device number from the unauthorized device;
converting the unauthorized device into an authorized device by regenerating the IFEK, based at least in part on the original device number and the internal split;
decrypting the encrypted mission files using the IFEK to produce remote decrypted mission files; and
installing the remote decrypted mission files in the authorized device.

16. The method of claim 15 wherein, while the mission module remains attached to the authorized device, the mission module acts as a key manager allowing the authorized device to be powered down and later restarted in a same mission state.

17. The method of claim 15 further comprising:
detecting that the C1K is connected to the mission module prior to the decrypting and authenticating the mission files to produce local decrypted mission files.

18. The method of claim 15 further comprising:
upon removal of the mission module from the authorized device, converting the authorized device back to an unauthorized device and deleting the IFEK, the internal split and all mission files from the unauthorized device.

19. The method of claim 15 further comprising:
detecting a proper user login to the unauthorized device prior to the reading the original device number from the unauthorized device.

* * * * *